Dec. 28, 1943.  G. R. ERICSON  2,337,982
CONTROL DEVICES
Filed July 13, 1942   2 Sheets-Sheet 2

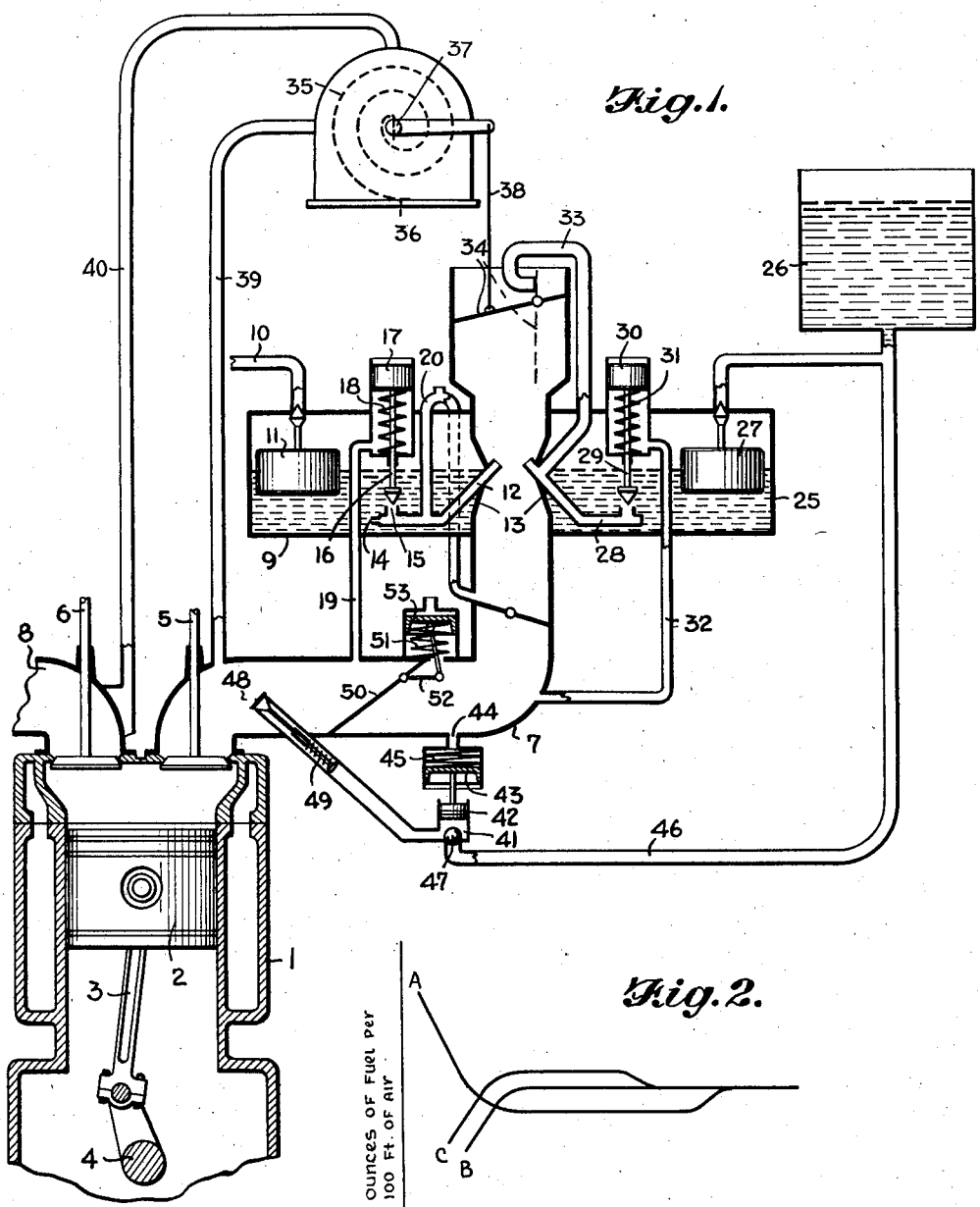

INVENTOR
George R. Ericson

Patented Dec. 28, 1943

2,337,982

UNITED STATES PATENT OFFICE 2,337,982

CONTROL DEVICE

George R. Ericson, Kirkwood, Mo., assignor to Carter Carburetor Corporation, St. Louis, Mo., a corporation of Delaware Application July 13, 1942, Serial No. 450,728

3 Claims. (Cl. 123—52)

This invention relates to internal combustion engines and more specially to the elimination of objectionable detonation under certain conditions, as, for instance, when operating at low speed with the throttle in open position.

One of the main advantages of the invention is that it permits the use of higher cylinder head compression ratios and fuels with lower octane ratings than is otherwise practical. The invention will be better understood upon consideration of the following specification and accompanying drawings, which show a diagrammatic representation of the invention.

Another object of the invention is to enable the engine designer to obtain high torque at low speeds without sacrifice of torque at high speeds. One of the chief difficulties of obtaining high torque at both high and low speeds is that the valve timing for high speeds must be such as to hold the intake valve open until long after the intake stroke of the piston has been completed and until the piston has returned some 60° to 70° of circular travel past bottom dead center. This is necessary in order to give time for the inflowing gas to fill the cylinder. At low speeds, such valve timing makes the attainment of high torque impossible, because the charge having filled the cylinder during the down stroke of the piston is partially rejected from the cylinder during the first part of the return stroke of the piston before the intake valve is closed. For this reason, the valve timing is always a compromise between the optimum timing for high speed torque and optimum timing for low speed torque.

One of the reasons for rejecting a portion of the charge at low speeds is to avoid overcharging of the cylinder and consequent detonation. One of the objects of my invention, accordingly, is to provide for the retention of a full charge in the cylinder at low speeds without sacrificing ability to obtain a full charge at high speeds, and, at the same time, to provide means for preventing the detonation which would otherwise make the retention of a full charge in the cylinder at low speeds impractical.

This application is a continuation in part of my copending application, Serial No. 429,427, filed February 3, 1942, for improvements in "Control devices."

Figure 1 is a diagrammatic elevation mainly in section, illustrating a mechanism for accomplishing the purposes of the present invention.

Figure 2 is a flow curve showing the character of the fuel mixture delivered by the device shown in Figure 1.

Figure 3:
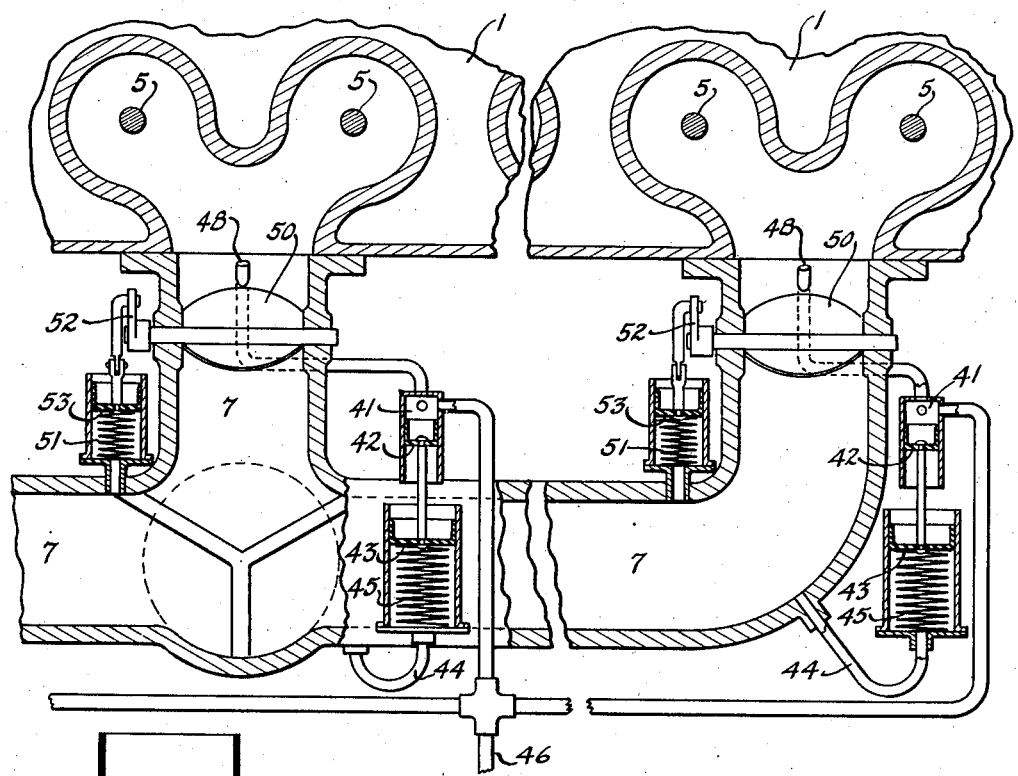
Figure 3 is a diagrammatic sectional plan view showing the application of parts of the invention to a multi-cylinder manifold.

The reference numeral 1 indicates the cylinder of an internal combustion engine having a piston 2, connecting rod 3, and crank shaft 4, the usual intake valve 5 and exhaust 6 controlling intake manifold 7 and exhaust manifold 8, respectively, it being understood that the engine may be of the multi-cylinder four cycle type, although it is not necessarily limited to this type.

The liquid fuel is supplied to the float chamber 9 through the conduit 10, and the supply is controlled by a conventional float and valve 11. The carburetor includes a throttle 110 and a throttle operated metering rod, the accelerating pump, and other elements, structure, and mode of operation of the carburetor shown in my Patent No. 1,915,851, issued June 27, 1933.

Among the instrumentalities of the carburetor is included the nozzle 12 mounted in the throat of the venturi 13 and receiving fuel from the float chamber 9. This fuel supply is delivered from a main jet 14 and an auxiliary jet 15 which is controlled by the suction operated valve 16. To operate this valve, the piston 17, normally held in upward position by the spring 18 and controlled by manifold suction through the conduit 19, is provided. Conventional air bleeds and throttle operated step-up or metering rod are not shown, but may be used, if desired. The idle passageway 20 discharging adjacent the edge of the throttle valve may also be of conventional form. The function of the valve 16 is to supply an especially rich fuel mixture during detonating conditions to assist in holding the detonation to a minimum without actually weakening the force of the explosion. It will be understood that the amount of fuel which can be used in reduction of detonation is substantially more than the amount of fuel necessary to obtain maximum power performance, and Figure 2 shows the approximate relation of the various fuel curves in which A represents the fuel-air ratio curve for maximum economy. B represents the fuel curve giving maximum power, and C represents the fuel-air ratio curve for maximum elimination of detonation without sacrifice of power. The carburetor contains the instrumentalities for obtaining the fuel curves A and B, and it will be understood that these are obtainable with prior carburetors such, for instance, as that shown in my above mentioned Patent No. 1,915,851.

In addition to these instrumentalities, the piston 17 is operated under low manifold vacuum conditions, for instance, when the manifold suction is below 5 inches of mercury vacuum to add an increased amount of fuel beyond the maximum power mixture to reduce detonation. The exact point of manifold depression at which a supply of anti-detonating fluid or excess fuel is required will depend on compression ratios, octane ratings, altitude, and combustion chamber design, so that the figure of 5 inches of mercury is only illustrative.

Cooperating with the above described structure is a device for supplying anti-detonating fluid. This device has a float chamber 25 receiving liquid from a tank 26, the supply being maintained at constant level in the float chamber by means of the float 27. A nozzle 28 is operated by suction to discharge a calibrated quantity of the liquid into the venturi by suction. The operation of this liquid supply device is controlled by a valve 29 connected to the piston 30 normally held in upward position by the spring 31. The piston is pulled down by suction communicated through the conduit 32 from the intake manifold, so that the supply of this fluid is controlled in the same way as the supply of additional fuel. In order to prevent the operation of the anti-detonating fluid supply at low temperatures, an air supply conduit 33 is connected to the nozzle just anterior to its point of discharge in such a manner as to kill the suction and thereby prevent the action of the suction to withdraw fuel from the float chamber. It will be understood that the air inlet of the carburetor is controlled by a thermostatically operated choke valve 34. It will be noted that the thermostat 35 mounted in the housing 36 and operating the rotatable shaft 37 is connected to the choke valve by the link 38. A suction conduit 39 and a hot air supply conduit 40 heat the thermostat when the engine is in operation. When the choke valve is in wide open position, as when the engine is hot, the upper edge of the choke valve closes the end of the tube 33, so that the supply of atmospheric air to the nozzle 28 is cut off, and the nozzle can function in the normal manner. The particular arrangement shown may be varied, and any means for disabling or cutting off the supply of anti-detonating fluid, when the choke valve is not in fully open position, would serve a similar purpose.

In order to supplement the supply of anti-detonating fluid, especially when the throttle is suddenly opened, I provide a suction operated pump comprising the cylinder 41 having a piston 42 therein operated by the diaphragm or piston 43 to which suction is supplied from the intake manifold through the conduit 44. The discharge of the pump is caused by the spring 45. The pump is supplied with anti-detonating fluid through the conduit 46 and is provided with check valves 47 and 48. The discharge valve 48 is in the form of a spray valve, which is operated by substantial pressure and opening against the spring 49, so that upon the increase of pressure in the intake manifold, as when the throttle is opened, a fine spray of anti-detonating fluid will be introduced to the manifold closely adjacent the intake valve. The pressure to which the valve 48 responds is in excess of the maximum manifold suction, so that no discharge occurs when the throttle is closed. Obviously, this valve may be mounted in the carburetor in the same way as the accelerating pump of the said Patent No. 1,915,851, or Bicknell Patent No. 2,252,958, but the advantage of discharging close to the intake valve will not be obtained.

In order to balance the torque curve of the engine, I provide a valve 50 mounted in the intake manifold close to the intake port. This valve is normally held in closed position by the spring 51 operating through the linkage 52 and piston 53, so that when the suction applied to the piston 53 is high, the valve will be in wide open position and will not form a restriction. However, when the suction applied to the piston is low, the valve will be yieldingly closed by the spring, and each suction impulse of the engine will cause the valve to open by the direct action of suction on the valve. This assists in the vaporizing of the fuel and anti-detonating compound and also causes the member 50 to act as a check valve. By this means, I am enabled to close the intake valve of the engine as late as 75° or 80° after bottom dead center in order to obtain maximum horse power at top speed without sacrificing torque at the low speed end of the torque curve. The reason for this is that the part of the charge which would normally be rejected from the cylinder by reason of the late closing of the intake valve is caught by the check valve 50 and prevented from being forced back toward the carburetor. This increase of the low speed charge of the engine, however, would prevent the use of the high compression ratios desired, unless some means is introduced to prevent detonation. However, with the device shown herein, I am enabled to eliminate this objectionable detonation sufficiently to use very high compression ratios, that is, in the order of 8 to 1 or more without encountering serious detonation or loss of power at low speed.

Figure 4:
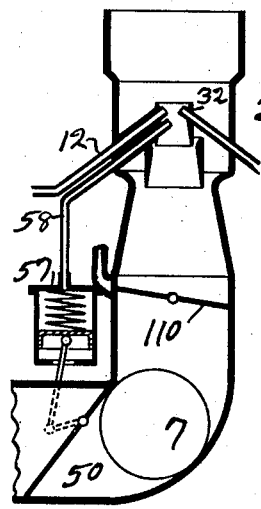
Figure 4 is a diagram of a modification.

In some constructions, particularly where maximum volumetric efficiency is desired and where little or no manifold heat is used, it is desirable to hold the valve 50 yieldably closed during part throttle operation. In Figures 3 and 4, I have shown the piston 53 mounted in a cylinder 57, which is connected with the suction zone of the Venturi stack 131 by means of tube 58, so that the valve 50 is held in wide open position only when the engine is being operated at high speed.

In order to fully understand the operation of the valve 50, it is necessary to analyze the cycle of a multi-cylinder engine, and, for this purpose, we may take a typical popular passenger car engine of the six cylinder type which, for convenience, will be referred to as "engine H."

In this engine, the intake valve opens 11° before top dead center and closes 60° after bottom dead center. That leaves the valve open a total of 251°. The intake manifold has three branches connected to Siamese ports, so that the first and second cylinders receive fuel from one branch, the third and fourth cylinders from another branch, and the fifth and sixth from a third branch. The firing order of the cylinders is 1—5—3—6—4—2. The maximum torque is obtained at 1200 R. P. M., and the maximum horse power at 4000 R. P. M.

Figure 5:
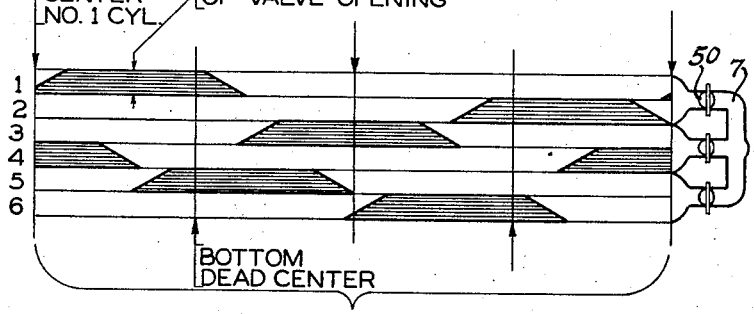
Figure 5 is a diagram showing the intake valve periods of the engine.

From the diagram in Figure 5, it will be seen that the intake valves of cylinders No. 1 and No. 2 are open at the same time during only 11° of crank shaft travel. Also, the intake valves of No. 5 and No. 6 cylinders are open at the same time only 11° of crank shaft travel, but these valves are actually not fully open, but almost closed; that is, when the intake valve of No. 2 cylinder is nearly closed, the intake valve of No. 1 cylinder is just beginning to open. Furthermore, the time interval is so short as to be negligible. For this reason, a single valve 50 may be used in each of the three branches of the manifold for this particular engine, and it is unnecessary to provide a separate valve for each cylinder.

The above diagram is based on a typical six cylinder engine, but there are some engines in which the intake valve is held open much longer after bottom dead center. In an extreme case, the intake valve opens 28° before top dead center and closes 68° after. However, even in this extreme case, the amount of lap in the opening of the valves does not prevent the use of a single valve for both cylinders in the Siamese port.

It will be understood, however, that in eight cylinder engines, the lap in intake valve openings from the same branch of the manifold may be entirely too great to permit the use of a single check valve to control the back flow from both of the cylinders which are connected to the double port, and, in such cases, I provide separate valves 50 to control each individual cylinder inlet.

It will be understood that in addition to the above instrumentalities, I may also provide the conventional manifold vacuum operated spark control for retarding the spark under low speed wide open throttle operating conditions, but this structure is well known in the art and need not be described here.

As an anti-detonating fluid, I prefer to use water. The only disadvantage in the use of water for this purpose is that it is likely to freeze in winter. This is objectionable, because it is likely to burst the tank or pipe and also because of the fact that it would not melt soon enough after the engine starts to give the desired anti-detonating effect. It is possible to avoid this difficulty in winter time by adding an anti-freeze, such as alcohol, to the water, and if this is introduced in sufficient strength of solution to withstand the temperature to which the car is likely to be subjected, the disadvantage will be eliminated. When alcohol is used as the anti-freeze, the fuel value of the alcohol is added to the fuel value of the gasoline furnished by the carburetor, and this, in itself, helps eliminate detonation by enriching the fuel mixture.

Another method of reducing the detonation involves the use of the exhaust gas from the engine as an anti-detonating fluid. With such a construction, a pipe is led from the exhaust pipe to discharge into the air inlet of the carburetor near the venturi, and this pipe is controlled in accordance with the manifold vacuum by a valve operating in the manner shown herein, that is the introduction of exhaust gas for use as an anti-detonating fluid is controlled in the same way as the introduction of water, alcohol, or a tetra-ethyl lead solution. It will be understood that any of the well known anti-detonating fluids may be added in the manner indicated.

I claim:

1. In an internal combustion engine of the multi-cylinder four cycle type, said engine having a branched intake passage and intake valves timed to close at a point substantially later in the cycle than the bottom dead center of the pistons, whereby the piston tends to reject a portion of the charge during low speed conditions, check valve means in at least one of said branches to prevent the rejection of the charge under such conditions, and means for shifting said check valve to inoperative position.

2. In an internal combustion engine of the multi-cylinder four cycle type, said engine having a branched intake passage and intake valves timed to close at a point substantially later in the cycle than the bottom dead center of the pistons, whereby the piston tends to reject a portion of the charge during low speed conditions, check valve means in at least one of said branches to prevent the rejection of the charge under such conditions, and means responsive to suction for shifting said valve to inoperative position under certain conditions.

3. In an internal combustion engine of the four cycle type and having a plurality of cylinders, said cylinders having intake valves timed to close at a point substantially later in the cycle than the bottom dead center position of the piston, whereby the piston tends to reject a portion of the charge, a branched intake conduit having each of its branches connected to one or more of said cylinders, a throttle valve for controlling said intake conduit, valve means in at least one of said branches to prevent rejection of the charge from such cylinder, and means responsive to suction anterior to said throttle for controlling a function of said valve.

GEORGE R. ERICSON.